May 10, 1927.  
N. DOBROWOLSKI ET AL  
1,628,492  
DRIVING GEAR FOR LOCOMOTIVES EQUIPPED WITH INTERNAL COMBUSTION ENGINES  
Filed Aug. 17, 1925  
2 Sheets-Sheet 1
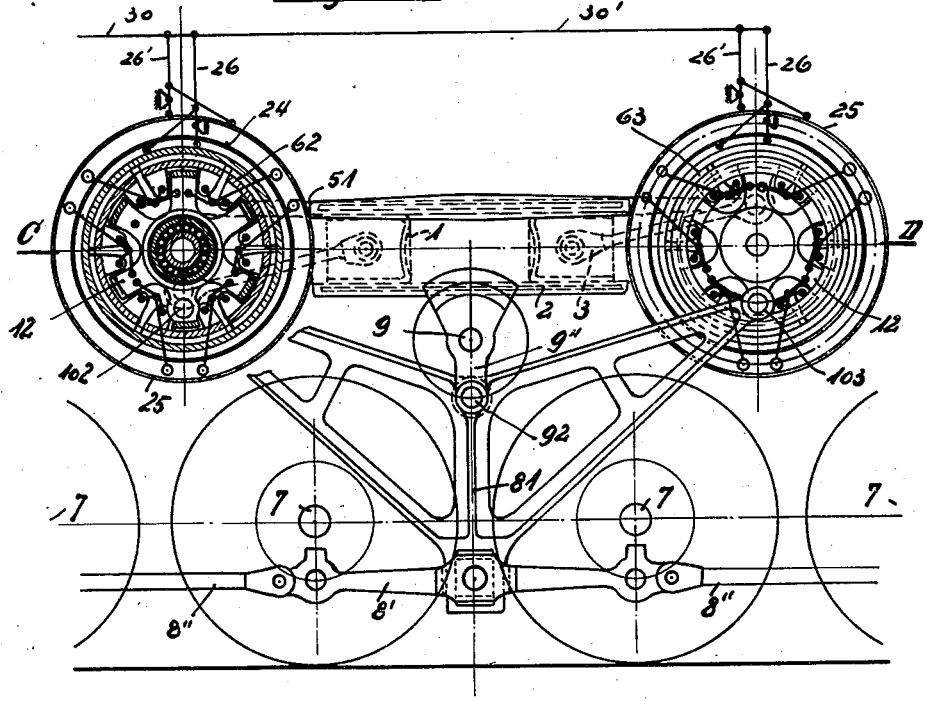
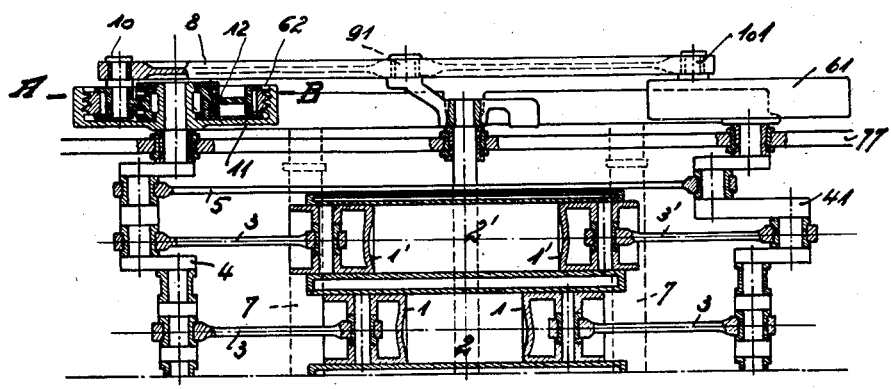
Inventors:
Nikolaus Dobrowolski
Otto Günther
by [signature]
Atty.

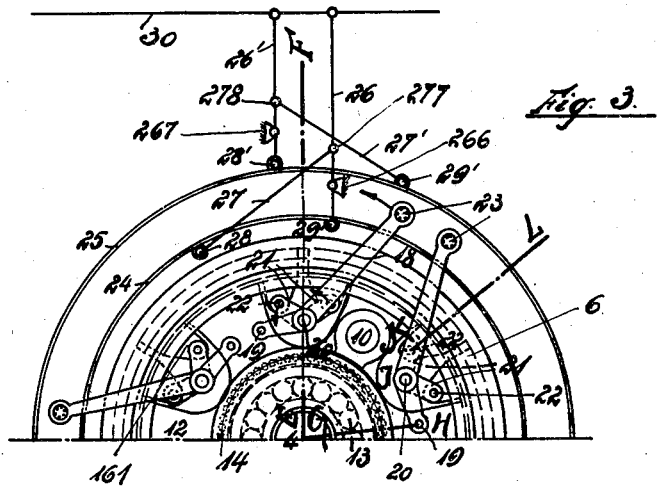

Patented May 10, 1927.

1,628,492

UNITED STATES PATENT OFFICE.

NIKOLAUS DOBROWOLSKI AND OTTO GÜNTHER, OF ESSLINGEN-ON-THE-NECKAR, GERMANY.

DRIVING GEAR FOR LOCOMOTIVES EQUIPPED WITH INTERNAL-COMBUSTION ENGINES.

Application filed August 17, 1925, Serial No. 50,810, and in Germany November 12, 1924.

Our invention relates to locomotives equipped with internal combustion engines, and more especially to driving gear for such locomotives, and it is an object of our invention to provide a gear of the kind described in which the rotation of the crank shaft is directly transmitted to the wheels of the locomotive without involving the necessity of starting the locomotive and its train by means of compressed air supplied to the engine.

To this end we insert a friction clutch in the drive which clutch permits starting the engine independently of the locomotive and gradually connecting its wheels with the engine by the friction clutch so that the locomotive is not started at the same time as its engine but only when the engine has attained the desired number of revolutions.

The operation of locomotives by internal combustion engines and the usual electric, hydraulic, pneumatic and mechanical drives involves the drawbacks that the first cost and the weight of the locomotive are unduly increased, that power is wasted and that the efficiency, reliability and safety of operation are reduced.

It has been proposed to employ a direct drive from the crank shaft of the engine to the wheels of the locomotive, by means of side rods. This method however, involves the severe drawback that, when starting the engine with compressed air in the usual way, the locomotive is started at the same time and so is its train, if any. Compressed air must be supplied to the engine until the velocity of the locomotive is so high that the corresponding number of revolutions of the engine is sufficient for igniting the injected fuel. This method obviously requires a considerable quantity of compressed air which is carried on the engine, and it is difficult or even impracticable to carry a quantity which will be sufficient for given conditions of operation, for instance when the locomotive must start on severe gradients.

All these drawbacks are overcome by inserting a friction clutch according to our invention so that the engine is able to start independently of the locomotive and the wheels of the locomotive may be gradually connected with the engine by the friction clutch. Our improved friction clutch may be operated by any suitable means, such as mechanical, hydraulic, pneumatic or electromagnetic apparatus.

In any case it is necessary that the clutch should be inserted between the crank shaft or crank shafts of the engine or engines and the wheels of the locomotive. If a loose shaft is provided, the clutch will be inserted between said loose shaft and the wheels of the locomotive.

By inserting a friction clutch as described, we provide a driving gear which is radically different from all direct drives as heretofore described. It will be understood that with our novel gear the operation of the locomotive is also varied as compared with the old methods, it being no longer required to start a train by compressed air, as it is only necessary to start the engine independently of the locomotive and to gradually throw in the clutch so that the rotation of the crank shaft or crank shafts is gradually transmitted to the wheels of the locomotive and so starts the locomotive and its train. Similarly, the clutch is thrown out when it is desired to stop the train, and the engine continues its rotation independently.

In the drawings affixed to this specification and forming part thereof, a gear embodying our invention is illustrated diagrammatically by way of example.

Referring now to the drawings,

Fig. 1 is an elevation of our improved gear, one of its clutches being shown in section on the line A—B of Fig. 2.

Fig. 2 is a plan view of the gear showing one side of a locomotive to which it is applied, and partly in section on the line C—D of Fig. 1.

Fig. 3 is an end elevation of the upper half of a friction clutch on a larger scale.

Fig. 4 is a section on the line E—F of Fig. 3.

Fig. 5 is a section on the line G—H—J—K—L of Fig. 3, and

Fig. 6 is also a section on the line E—F of Fig. 3, showing a water-cooled clutch disc.

The engine is supposed to have four horizontal cylinders, two of which 2 and 2', each with a pair of pistons 1, 1 and 1', 1', respectively, are shown in axial section in Fig. 2. The pistons of the cylinders impart rotation to crank shafts 4 and 41 through the medium of connecting rods 3, 3 and 3', 3', respectively, and the ends of the two crank shafts are connected by coupling rods 5 and 51 so as to maintain the cranks of both shafts in a predetermined relative position.

Clutches 6, 61, 62 and 63 are secured on the ends of the crank shafts. Each clutch comprises a driving part 11, the boss 11' of which is keyed to the shaft 4, and a driven part 12 which is free to rotate on said boss 11' and may be seated thereon by means of a roller bearing 13. Crank pins 10, 101, 102 and 103 are secured in each driven part 12. Two crank pins on either side of the engine are connected by a triangular side rod 8 and 81, respectively, which in turn are connected with the wheels on the axles 7 of the locomotive by side rods 8' and 8''. A loose shaft 9 is carried in the frame 77 of the locomotive and provided with cranks 9' and 9'' at right angles to one another which cranks are connected with the respective triangular side rods 8 and 81 by pins $9^1$ and $9^2$ so as to maintain the cranks of the locomotive wheels at right angles to one another on either side of the locomotive, as usually.

It will be understood that the position of the crank pins 10, 101, 102 and 103 on the driven parts 12 of the clutches is independent of the position of the crank shafts 4 and 41 while the position of said pins with regard to the cranks of the locomotive is controlled by the loose shaft 9 and its cranks. As the cranks of this shaft are at right angles to one another, it will be understood that one of said cranks, for instance 9'', when it is in substantially vertical position as shown in Fig. 1, is held in such position by the cranks of the locomotive wheels and the side rod 81, and at the same time the crank 9', so controls its side rod 8 that its dead centre positions at both clutches are timed exactly, even if only one of the clutches with which said rod 8 is connected is operative while the other is running idle, and also when the bearings of the locomotive axles have become worn.

One of the friction clutches is shown on a larger scale in Figs. 3 and 6. The driven part 11 is keyed on the end of one of the crank shafts, for instance 4, and the boss of the driven part or crank disc 12 is rotatably carried on the boss 11' of the driving part by the roller bearing 13 and a thrust ball bearing 14. Jaws 16 are guided in the rim 15 of the crank disc 12 by means of inwardly projecting lugs 161 and adapted to engage the rim 17 of the driving part 11 to which they are held by centrifugal force when the crank disc 12 is rotating at high speed. The mating faces of the jaws and the rim are grooved circumferentially.

The means for throwing in the clutch by moving radially outwards the jaws 16 comprise a lever 18 for each jaw which is fulcrumed on a pin 19 secured to the boss of the driven part 12, as shown in Fig. 5. A pin 20 on said lever is connected with a pin 22 in each of two adjacent lugs 161 by links 21. A roller 23 is arranged at the outer end of the lever 18. Circular steel bands 24, 25 extend on the inside and the outside of the rollers 23 as shown in Fig. 3. A cable or the like 30 which is adapted to be operated from the cab is connected with two double-armed levers 26 and 26'. The lever 26 is fulcrumed at 266 and pivoted to the inner band 24 at 29. The band is divided at this point and a cable or the like 27 is secured to the other end of the band at 28 and to the lever 26 at 277. Similarly, the band 25 is divided between the points 28' and 29' one end being directly connected to the lever 26' which is fulcrumed at 267 and the other end being connected to a pin 278 on the lever at one end and secured to the band 25 at 29'.

As shown in Fig. 6, the rim 17' of the driving part 11' is provided with a cooling jacket 31 in which a liquid, preferably water, is circulating in order to absorb the heat which is generated when the parts of the clutch are sliding. The cooling jacket 31 is connected with an annular passage 33 into which cooling water is injected from a nozzle 32. The water is moved towards the circumference of the driven part by centrifugal action when the speed has attained a certain and comparatively low value, and discharged through a passage 34 and past the friction surfaces 35 of the clutch so that such surfaces are cooled and cleaned at the same time.

The water is discharged in liquid of gaseous condition, according to the temperature of the clutch.

The operation of our improved gear is as follows:

When the locomotive is started and the number of revolutions of the crank discs is small, the lever 26 is operated by the driver so as to increase the diameter of the band 24, causing the jaws 16 to engage the rim 17 in which they may slide or to which they may be permanently held, transmitting the rotation of the driving part 11 to the driven part 12. When the number of revolutions is increased, the jaws will be forced against the rim 17 by centrifugal action so that it is not necessary to hold the jaws engaged by the band 24. When the clutch is to be thrown out under these conditions, the diameter of the band 25 is reduced by operating the lever 26' so that the rollers 23 are forced radially inwards.

By directly transmitting power from the engine to the wheels of the locomotive by friction as described, we obtain the efficiency of direct transmission as soon as the axles of the locomotive rotate at the same speed as the crank shaft or crank shafts of the engine as under these conditions the friction clutches are equal to solid cranks and so the high thermal efficiency of the combustion engine is transmitted to the wheels of the locomotive practically without loss during maximum load conditions. The starting efficiency is also comparatively high and certainly higher than that of pneumatic, steam or oil transmission gears.

Our improved friction clutches are adapted to be regulated exactly so as, on the one hand, to transmit the torque of the engine under starting conditions, that is at maximum relative velocity of the friction surfaces, so completely as is permitted by the friction of the wheels on the rails without permitting the number of revolutions of the engine to fall below the limit of reliable ignition and, on the other hand, to reduce the transmission at increasing speed and, consequently, decreasing relative velocity of the friction surfaces so that neither slipping of the wheels nor an undesirable braking action will be exerted on the engine.

The torque of the engine is utilized the more completely at the wheels of the locomotive, the more uniformly the transmission is effected during a revolution, particularly when the torque attains the slipping limit. Therefore it is very important that our improved clutch should be arranged on either side of the engine. If this condition is fulfilled, variations of torque are transmitted substantially uniformly to the clutches and driving wheels on both sides and the peaks beyond the average torque are similarly and uniformly distributed. A one-sided clutch would transmit the entire peak to the driving axle on one side and so would promote sliding of the wheels for every variation of the torque transmitted from one wheel to the other through the axle brings about a variation of the angle at which the cranks of said wheels are to one another which variation however, can only occur after one of the wheels has slipped to a certain extent. However, this slipping is sufficient to cause slipping of the wheels when the torque is approximating the friction limit.

When the clutches are arranged at both ends of the engine as shown, the relative position of the cranks of the wheels should not be determined by the driving wheels but by a loose shaft, as shown.

Assuming that the maximum output of the engine is obtained at 400 revolutions p. m. and that ignition is reliable at 100 revolutions p. m., then in an express locomotive the maximum speed is 60 miles p. h., the clutches would be rigidly set at as low a speed as 15 miles p. h. A few minutes or even a few seconds may be required for attaining this speed at starting, when the usual acceleration of the train is effected by the output of the locomotive which is limited by the adhesion weight of the locomotive and the torque of the engine. Now, as normally the maximum output of a locomotive is required at ½ or ⅔ of its maximum speed corresponding to 200 or 266 revolutions p. m., the mean indicated pressure of the engine will be about 125 lbs. p. squ. in. corresponding to a low stress on the engine, assuming that the operating conditions of an express locomotive are those existing at present and that the adhesion weight is utilized as far as the slipping limit.

For an up to date freight locomotive conditions are about the same, assuming a two-cycle engine at about 240 revolutions p. m.

The weight of the locomotive is less than that of the usual Diesel locomotives with electric, hydraulic or pneumatic transmission and also less than that of a steam locomotive even assuming that the weight of the engine is 45 lbs. p. h. p.

As the output of the engine can be reduced within the limits of economy to more than half its normal output by regulating the fuel supply and it is possible to throw out one or several engines of a locomotive, all the requirements of railway operation can be fulfilled.

The possibility of independently operating each engine which is afforded by our improved friction clutch, considerably increases the reliability of the locomotive and is favourable for the construction of large articulated locomotives. Fly-wheels may be dispensed with as they are provided by the friction clutches.

We wish it to be understood that we do not desire to be limited to the exact details shown and described, for obvious modifications will occur to persons skilled in the art.

We claim:—

1. Locomotive comprising an internal combustion engine, driving wheels, a crank shaft at each end of said engine, a friction clutch at each end of said crank shafts, and means for transmitting power from said clutches to said wheels.

2. Locomotive comprising an internal combustion engine, driving wheels, a crank shaft at each end of said engine, a friction clutch at each end of said crank shafts, a driving part in each clutch secured to its respective shaft, a driven part in each clutch, and means for transmitting power from said driven parts to said driving wheels.

3. Locomotive comprising an internal combustion engine, driving wheels, a crank shaft at each end of said engine, a friction clutch at each end of said crank shafts, a driving part in each clutch secured to its respective shaft, a driven part in each clutch, a crank pin secured to each driven part, and a side rod operatively connected with each pair of crank pins and said driving wheels.

4. Locomotive comprising an internal combustion engine, driving wheels, a crank shaft at each end of said engine, a friction clutch at each end of said crank shafts, a driving part in each clutch secured to its respective shaft, a driven part in each clutch, crank pins projecting from said driven parts at each side of the locomotive and side rods connecting each pair of adjacent crank pins and adapted to transmit power from said crank pins to said wheels.

5. Locomotive comprising an internal combustion engine, driving wheels, a crank shaft at each end of said engine, a friction clutch at each end of said crank shafts, a driving part in each clutch secured to its respective shaft, a driven part in each clutch, crank pins projecting from said driven parts at each side of the locomotive, side rods connecting each pair of adjacent crank pins and adapted to transmit power from said crank pins to said wheels, a loose shaft for each pair of side rods, said shaft being rotatably carried in the frame of the locomotive, and a crank on each end of said loose shaft which crank is operatively connected with the adjacent side rod.

6. Locomotive comprising an internal combustion engine, driving wheels, and gear including a friction clutch for transmitting power from said engine to said wheels, said friction clutch comprising jaws adapted to be brought into engagement alternately by centrifugal force and mechanical means.

In testimony whereof we affix our signatures.

NIKOLAUS DOBROWOLSKI.
OTTO GÜNTHER.